A. B. CRUICKSHANK,
HEAT DISTRIBUTER.
APPLICATION FILED AUG. 14, 1920.

1,392,868.

Patented Oct. 4, 1921.

INVENTOR
Arthur B Cruickshank
BY
HIS ATTORNEYS

UNITED STATES PATENT OFFICE.

ARTHUR B. CRUICKSHANK, OF LONDON, ENGLAND.

HEAT-DISTRIBUTER.

1,392,868.                     Specification of Letters Patent.        Patented Oct. 4, 1921.

Application filed August 14, 1920. Serial No. 403,499.

*To all whom it may concern:*

Be it known that I, ARTHUR B. CRUICKSHANK, a subject of the King of Great Britain, residing at London, England, have invented an Improvement in Heat-Distributers, of which the following is a specification.

My present invention relates to a heat distributer or that type of utensil commonly employed in connection with stoves for evenly distributing the heat and preventing the food in any given vessel from burning in the cooking operation. The invention furthermore relates to the single plate type of heat distributer which in various forms has been used heretofore. The heat distributer for cooking utensils patented to me July 20th, 1909 being an example of them, it was found impossible to construct this heat distributer, with the cupped up portions having lateral slots in them, as shown and described in the said patent, except by hand, at a prohibitive cost and furthermore the heat was not retained between the upper surface of the plate and the cooking vessel so that a great deal of it was lost. In my present invention I provide the plate with a plurality of openings having covers over them, the covers being provided with projections, so formed that it is easy to stamp them up by machinery, and the heat is thus deflected and guided in its path and more evenly distributed over the bottom of a cooking vessel than with cupped up portions in the plate having lateral slots in them. In carrying out the invention the heat distributer made in accordance therewith preferably comprises a single sheet of metal stamped and provided with series of concentric corrugations and also with series of radial corrugations with the spaces intermediate of the corrugations having openings therein which are fitted with covers or deflectors for directing the heat outwardly preferably against the corrugations so as to prevent the heated air and flame from contacting directly with the bottom of a cooking vessel. The plate is also preferably so shaped as to have a concave surface so that the heat is retained between the cooking vessel and the upper surface of the plate, and a depending rim sloping outwardly in order to give the plate sufficient strength to prevent the same from buckling or being warped out of shape by the effect of the heat in the cooking operation.

The heat distributer made in accordance with my present invention will be hereinafter more particularly described in conjunction with the accompanying drawings in which:—

Figure 1:
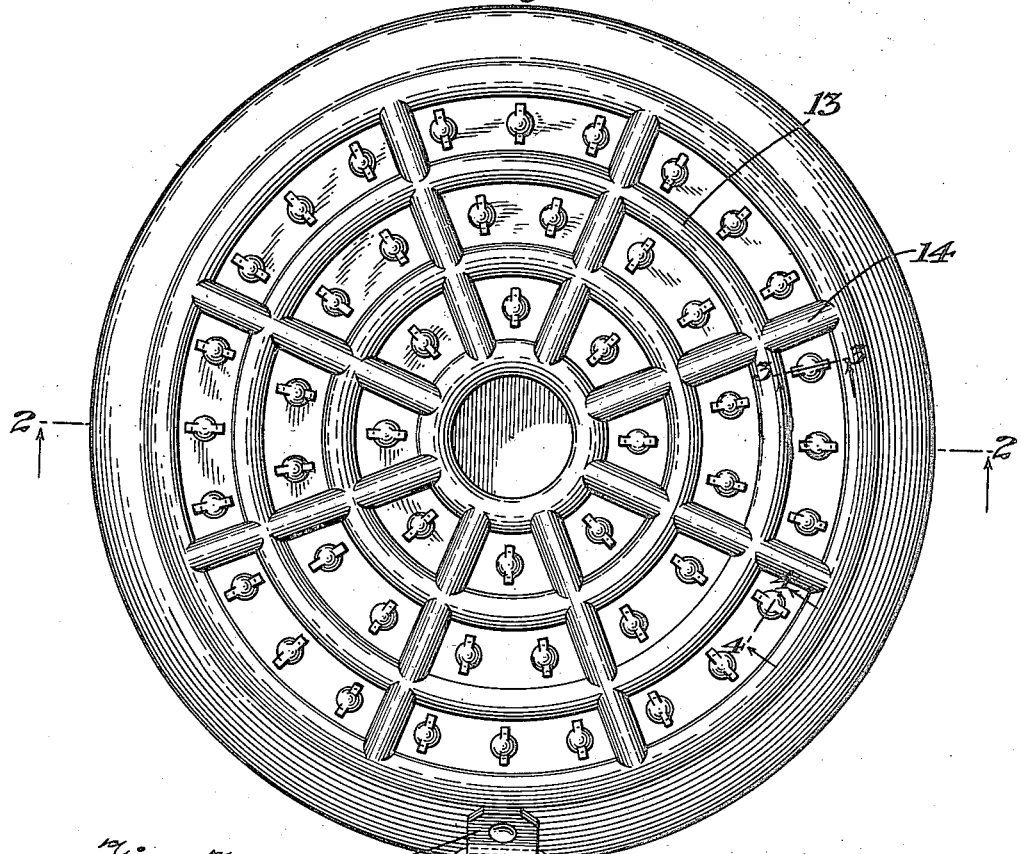
Figure 1 is a plan view of the heat distributer.
Figure 3:
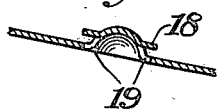
Fig. 3 is a cross section on line 3—3, Fig. 1.
Figure 4:
Fig. 4 is a cross section on line 4—4, Fig. 1, the cross sections shown in Figs. 3 and 4 being on an enlarged scale.
Figure 2:
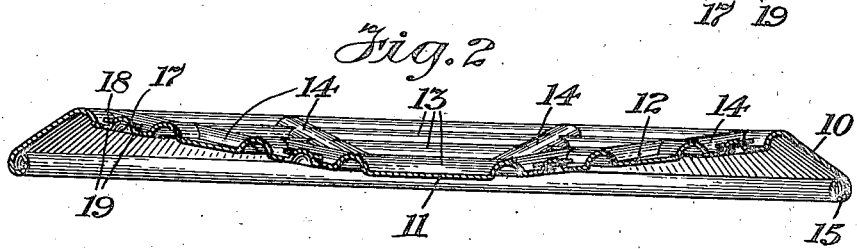
Fig. 2 is a cross section on line 2—2, Fig. 1.

Referring to the drawing, it will be seen that the heat distributer made in accordance with this invention is preferably stamped up from a single sheet of any suitable metal so as to comprise a rim member 10 and a face member preferably concave and having a central portion 11 with an intermediate portion 12. The concavity of the face is preferably in the intermediate portion 12, that is the portion between the rim and the central section, and in this portion there is provided a series of concentric ribs or corrugations 13 and also a series of radially disposed ribs or corrugations 14, while the rim 10 is preferably at an inclination extending outwardly and at its extremity provided with a rolled edge 15 acting as a base therefor, although, as will be understood, the edge of the rim forming the base may be made in any desired manner.

Arranged in the intermediate portion and in the spaces thereof between the concentric and radially disposed ribs or corrugations, I provide a plurality of openings fitted with deflectors or covers for directing the heat outwardly and preventing the heated air and flame from coming into direct contact with the under side of the cooking vessel when placed on the distributer. These openings and their covers may assume various forms, and as illustrated there is employed a plurality of projections 16 extending upwardly in the spaces between the ribs in the upper surface of the plate and having corresponding recesses 17 in the under or inner side of the plate, and these projections, as shown, are substantially semi-spherical, although, of course, they may assume other configurations. Also as illustrated, in each of these projections the side walls are cut and the material turned up in oppositely disposed positions to provide the deflectors indicated at 18 to prevent the heated air and flame from coming into direct contact with the under surface of a cooking vessel by passing through the openings or holes 19 consequently made in the walls of the projections. Also as illustrated, these deflectors or lips 18 are disposed radially so that the heated air and flame which pass through the openings are directed against the adjacent portions of the concentric ribs or corrugations, although these openings and deflectors may be placed in any desired position.

The heat distributer may also be provided with a clip 20 secured to the rim and fitted with a ring 21 by which the utensil may be supported from a hook or nail in a convenient place when not in use.

From the foregoing, it will be apparent that the heat distributer made in accordance with this invention provides a chamber beneath the concave surface of the plate and the sloping or inclined rim for containing the flame and heated air and in which the heat is retained and equalized and permitted to escape through the openings 19 into a chamber between the upper surface of the distributing plate and the bottom of the cooking vessel which also acts as a heating chamber in which the heat is further retained and equalized so that a minimum amount of fuel is necessary in the use of the heat distributer in the cooking operation. It will also be understood that inasmuch as the deflectors or covers 18 prevent the heated air or flame from contacting directly with the under surface of the cooking vessel, it is substantially impossible to burn the food when cooking the same. Furthermore that due to the depending rim and concave face of the distributer the construction is such that there is sufficient strength in the utensil to prevent the same from being buckled or warped out of shape due to the effect of the heat in the use thereof in cooking.

I claim as my invention:

1. A heat distributer plate having a concave upper face provided with a plurality of openings between series of concentric ribs, a cover for each opening, and projections extending from each cover so as to direct the path of heated air and flame which may pass through the opening against the adjacent portion of the said ribs.

2. A heat distributer plate having a concave upper face provided with a series of concentric ribs and also with radially disposed ribs, there being an opening in each portion of the plate surrounded by the said ribs, a cover for each of the said openings, and oppositely disposed radially placed projections extending from each of said covers to direct the path of heated air and flame passing through the opening against the adjacent portions of the said concentric ribs.

3. A heat distributer plate having a concave upper face provided with a series of concentric ribs, and also with radially disposed ribs, there being an opening in each portion of the plate surrounded by the said ribs, a cover for each of the said openings, oppositely disposed radially placed projections extending from each of said covers to direct the path of heated air and flame passing through the opening against the adjacent portions of the said concentric ribs, and a depending peripheral flange, the base of which forms a support for the heat distributer.

Signed by me this 23 day of July 1920.

ARTHUR B. CRUICKSHANK.